United States Patent
Pantos

(10) Patent No.: US 11,197,052 B2
(45) Date of Patent: Dec. 7, 2021

(54) LOW LATENCY STREAMING MEDIA

(71) Applicant: Apple Inc., Cupertino, CA (US)

(72) Inventor: Roger N. Pantos, Scotts Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/946,588

(22) Filed: Jun. 29, 2020

(65) Prior Publication Data

US 2021/0014550 A1    Jan. 14, 2021

Related U.S. Application Data

(60) Provisional application No. 62/873,664, filed on Jul. 12, 2019.

(51) Int. Cl.
| | |
|---|---|
| *G06F 15/16* | (2006.01) |
| *H04N 21/2662* | (2011.01) |
| *H04N 21/845* | (2011.01) |
| *H04N 21/84* | (2011.01) |
| *H04N 21/2187* | (2011.01) |

(52) U.S. Cl.
CPC ..... *H04N 21/2662* (2013.01); *H04N 21/2187* (2013.01); *H04N 21/84* (2013.01); *H04N 21/8456* (2013.01)

(58) Field of Classification Search
CPC .......... H04N 21/2662; H04N 21/2187; H04N 21/84; H04N 21/8456
USPC ....................................................... 709/231
See application file for complete search history.

(56) References Cited

U.S. PATENT DOCUMENTS

| | | | |
|---|---|---|---|
| 8,156,089 B2 | 4/2012 | Pantos et al. | |
| 8,301,725 B2 | 10/2012 | Biderman et al. | |
| 8,650,192 B2 | 2/2014 | Biderman et al. | |
| 2011/0307545 A1 | 12/2011 | Bouazizi | |
| 2013/0031165 A1* | 1/2013 | Pantos ................ | H04L 65/607 709/203 |
| 2015/0373383 A1* | 12/2015 | Pichumani ....... | H04N 21/23439 725/90 |
| 2017/0171094 A1* | 6/2017 | Biderman .......... | H04N 21/8456 |

(Continued)

FOREIGN PATENT DOCUMENTS

| | | |
|---|---|---|
| WO | 2013163448 A1 | 10/2013 |
| WO | 2018125269 A1 | 7/2018 |

OTHER PUBLICATIONS

Iraj Sodagar: "The MPEG-DASH Standard for Multimedia Streaming Over the Internet", IEEE Multimedia, IEEE Service Center, new York, NY, US, vol. 18, No. 4, Apr. 1, 2011.

(Continued)

*Primary Examiner* — Alan S Chou
(74) *Attorney, Agent, or Firm* — Womble Bond Dickinson (US) LLP

(57) ABSTRACT

Methods and systems for discovering or tuning-in to near live or current playlists used to stream media content, particularly for live events during which the media content is streamed. The methods and systems can reduce the time required to tune-in to such live events. In one embodiment, a client device can receive an age data in a header of a message that returns a first playlist that was requested by an unattributed playlist request from the client device. The age data can be used to determine how many partial media segments to skip to tune-in to the live event.

18 Claims, 7 Drawing Sheets

(56) References Cited

U.S. PATENT DOCUMENTS

| | | | |
|---|---|---|---|
| 2017/0264683 A1 | 9/2017 | Thornburgh | |
| 2018/0262783 A1* | 9/2018 | Yang | H04N 21/2404 |
| 2020/0359062 A1* | 11/2020 | Pantos | H04N 21/2387 |
| 2021/0051353 A1* | 2/2021 | Cho | G06F 21/335 |
| 2021/0185401 A1* | 6/2021 | Pantos | H04L 65/4084 |
| 2021/0210078 A1* | 7/2021 | Miller | H04N 21/812 |

OTHER PUBLICATIONS

PCT Invitation to Pay Additional Fees and, Where Applicable, Protest Fee, for PCT/US2020/041456, mailed Oct. 21, 2020, 16 pages.

* cited by examiner msn = n msn = n + 1

LOW LATENCY STREAMING MEDIA

This application claims the benefit of U.S. Provisional Patent Application No. 62/873,664 filed Jul. 12, 2019, which is incorporated herein by reference.

BACKGROUND

This application is related to a U.S. provisional patent application No. 62/807,329, filed Feb. 19, 2019 by Roger N. Pantos and entitled Low Latency Streaming Media, and this provisional patent application is hereby incorporated herein by reference.

Many devices presently use streaming media content delivery systems to present content such as movies, television shows, recorded sports events, news programs, live events such as live sports events, live news events, etc. These streaming media content delivery systems typically use one or more playlists that enumerate an ordered series of uniform resource identifiers (URIs), such as uniform resource locators (URLs), to identify media segments that can be retrieved from one or more servers using conventional HTTP compliant requests. Once retrieved, the media segments can be presented on the client device that requested the media segments and then erased on the client device after the presentation of each of the media segments. These streaming media content delivery systems can display both recorded content, such as a movie or video on demand content or live content such as a live sports event or live news event that is happening at the same time that the user of a client device is watching the live sports event or live news event. The existing streaming content delivery systems include the DASH (Dynamic Adaptive Streaming over HTTP) based systems that are based on a standard (such as ISO/IEC 23009-1:2014) and systems from Apple Inc. based on Apple's HTTP live streaming (HLS) systems.

SUMMARY OF THE DESCRIPTION

This disclosure describes various techniques, systems, non-transitory machine readable media, and methods for reducing latency or otherwise improving the delivery or processing of streaming media content particularly when tuning into a live event that is presented through streaming media. When a client device initially tunes into a live event while the event is occurring, the client device will not have information about specific media segments at the end of the current playlist at the origin of the streaming content. Thus, a client device can only request a generic, unattributed playlist for the content, which may be many seconds behind the current time in the live event. If the user of the client device wants to see the live event as it happens, the client device must attempt to tune into the most recent content represented by the most recent playlist that is available from the origin. The client device can discover the most recent content by obtaining the playlist directly from the origin. But for large audiences this direct approach represents an unacceptably high burden on the origin server(s). It is therefore common for client devices to obtain the playlist from intermediate caching servers that store playlists and media segments identified in those playlists so that the large audience can be distributed across multiple caching servers. In order to reduce load on the origin server(s), those caching servers continue to cache a playlist for a period of time after it has been updated to a newer version from the origin server. The playlist delivered to a client by a caching server may therefore not be the most recent version. The various aspects described herein can improve how quickly client devices can tune into a live event to obtain a most recent playlist from caching servers. Those aspects can use data in the playlist, such as one or more of: media sequence numbers, part numbers, part target duration and age data in an age header or other header associated with a playlist response to compute an amount to skip or jump ahead of the last partial media segment at the end of a playlist, such as a playlist received as a response to an unattributed playlist request. For example, the client device can use the indicated age in the age data to determine a number of partial media segments to skip ahead of the last partial media segment.

According to one aspect, a method on a client device to tune-in to streaming content can include the following operations: requesting, by a first request, a first playlist for a media content, the first request not containing at least one attribute for a near live playlist for the media content; receiving the first playlist in a transfer protocol compliant manner, the first playlist comprising a plurality of uniform resource identifiers (URIs), the plurality of URIs indicating an order of playback of multiple media segments that can be received, in the transfer protocol compliant manner, to re-create the media content, the first playlist comprising a last URI in the order that identifies a last available media segment (e.g., the last partial media segment) in the first playlist; receiving, if provided, first age data associated with the first playlist, the first age data indicating an age of the first playlist on a caching server; determining, based on the first age data and based on the last URI, a first number of at least partial media segments after the last available partial media segment in the first playlist, the first number specifying a number of at least partial media segments to skip over, after the last available partial media segment, to tune in to the media content. In one aspect, the last URI includes a media sequence number and a part number, and the first playlist specifies a target duration and a part target duration. The first number of the at least partial media segments is determined, in one aspect, based on (1) the first age data and (2) the last media sequence number and part number in the last URI and (3) the part target duration. In one aspect, the part target duration is compared to a predetermined minimum age value, and the result of the comparison provides a base value from which the first number is determined. In one aspect, the predetermined age value can be equal to one, and the base value can be the first age data if the part target duration is greater than one second in duration, and the base value can be the first age data plus a first additional value (such as 1) if the part target duration is less than one second.

In one aspect, the method can further include the operation of: determining a first time period between a current time and one of (1) a time when the first request was requested or (2) a time of receipt of the first playlist. In one aspect, the method can further include adding a second additional value to the base value, the second additional value being based upon the first time period. In one implementation, the first number can be the sum of the base value, the first additional value if the part target duration is less than one second and the second additional value. According to one aspect, the method can further include the operations of: requesting a second playlist with a URI based on the first number; receiving the second playlist and a second age data; and updating the base value based on the second age data. According to one aspect, the method can further include the operation of: comparing the second age data to the part target duration to determine whether to exit a tune in mode.

In another aspect described herein, a method performed by a client device to tune into streaming media can include the following operations: requesting, by an unattributed request during a tune in mode, a first playlist for a streaming media content, the unattributed request lacking attributes for a near live playlist of the streaming media content; receiving the first playlist in a transfer protocol compliant manner, the first playlist comprising a plurality of uniform resource identifiers (URIs), the plurality of URIs indicating an order of playback of multiple media segments that can be received, in the transfer protocol compliant manner, to re-create the media content, the first playlist comprising a last URI in the order that identifies a last available media segment (such as a last partial media segment) in the first playlist; determining whether a first age data is received with the first playlist; and exiting the tune in mode in response to determining that the first age data was not received or has a minimum value if the first age data was received. In one aspect, the minimum value can be zero. In one aspect, the method can further include the operation of: determining, based on a difference value, a first number of at least partial media segments after the last available media segment in the first playlist, the first number specifying a number of at least partial media segments to skip over, after the last available media segment to tune in to the streaming media content. In one aspect, the difference value can include a difference between a first date header and a first modified header, wherein the first date header comprises a timestamp for a time when a caching server responded to the request for the first playlist and the last modified header comprises a timestamp for a time of last modification of the first playlist. In one aspect, the method can further include the operations of: requesting a first playlist with a URI based on the first number; and receiving the second playlist.

According to another aspect, a set of rules used by origin servers may also be implemented to improve the tune in time for client devices. In one implementation, these rules can include: always providing a last modified date data (of the most recent playlist at the origin server) in one or more headers with playlists. Thus, origin servers can provide the last modified date data for use by client devices when tuning into a live event. In one implementation, origin servers can also be configured to accept requests for playlists up to two or three partial media segments beyond a current live playlist at the origin server. In one aspect, origins servers may implement a limitation on the minimum part target duration; according to one aspect, this minimum part target duration may be, for example, 300 ms, and hence all part target durations must equal or exceed 300 ms according to this implementation example. In another aspect, caching servers can abide by a rule that requires the age data from the caching servers be provided with millisecond accuracy. Currently the age data in a standard age header represents the age of a cached object in whole (integer) seconds with no further resolution in time of how long the cached object has been cached at the caching server. A non-standard age header ("X-Age-ms" header) would represent the cached age (how long the cached object has been cached) with millisecond accuracy. This would give client devices a more precise view of the cached playlist's age (at the caching server) which can in some circumstances reduce the tune-in time for client devices.

The aspects and embodiments described herein can include non-transitory machine readable media that store executable computer program instructions that can cause one or more data processing systems (such as client devices and one or more server systems) to perform the one or more methods described herein when the computer program instructions are executed by the one or more data processing systems. The instructions can be stored in nonvolatile memory such as flash memory or dynamic random access memory or other forms of memory.

The above summary does not include an exhaustive list of all aspects and embodiments in this disclosure. All systems and methods can be practiced from all suitable combinations of the various aspects and embodiments summarized above and also those disclosed in the Detailed Description below.

BRIEF DESCRIPTION OF THE DRAWINGS

The aspects described herein are illustrated by way of example and not by limitation, in the figures of the accompanying drawings in which like reference numerals refer to similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

These existing systems can have difficulty delivering content for live events in a manner that has low latency relative to the live event. For example, for a live sports event that is happening while a user is viewing the live sports event using a streaming media system, an action that happened in the live event might not be displayed by the streaming media system until many seconds (e.g., 15 seconds or more) after the live event occurred (in real time). Many users may find this large latency disappointing, and thus there is a need to improve the latency of delivery in streaming media systems. This disclosure provides various solutions to solve this need.

Figure 1:
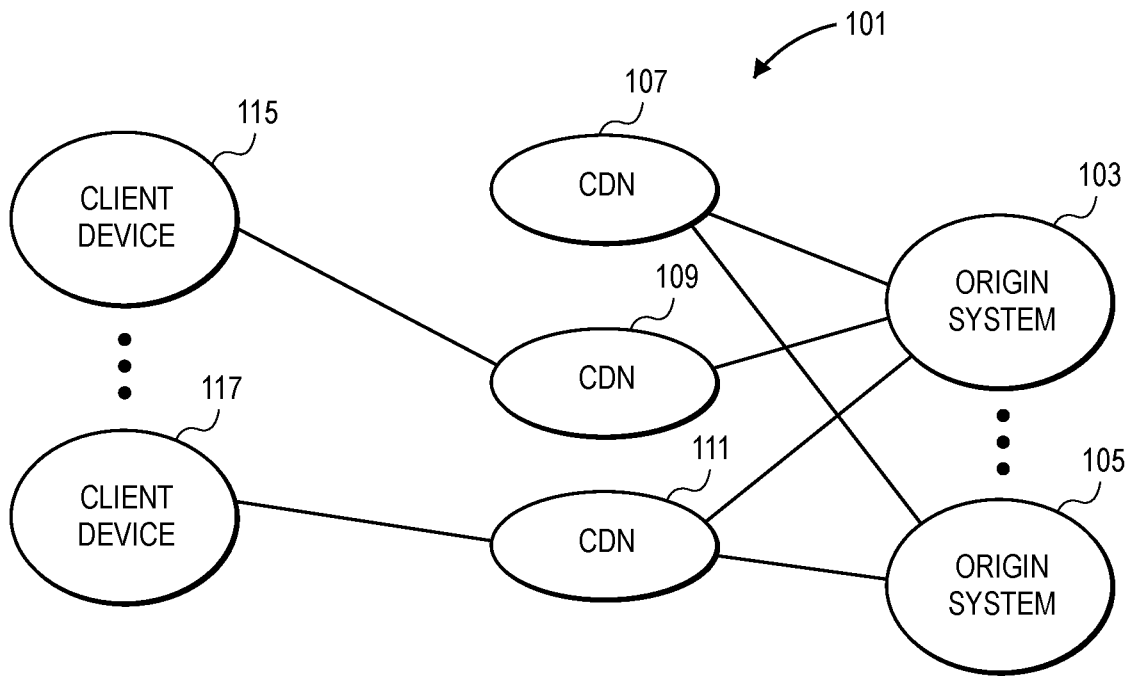
FIG. 1 shows an example of a system for delivering content through streaming media to one or more client devices from one or more origins systems are origins servers which are coupled to the client devices through one or more content distribution networks (CDNs).

The aspects, methods, and systems described herein provide techniques for discovering or tuning into streaming media content which can be useful when tuning into live events during which the media content is streamed. These aspects can reduce the time required to tune into such live events (such as a baseball game or a soccer game). Streaming media can be provided by systems that include content distribution networks (CDNs) which store playlists in caches on servers in the content distribution networks. FIG. 1 shows an example of a streaming media system 101 which includes a plurality of client devices and a plurality of content distribution networks and the plurality of origin systems. The content distribution networks can each include a plurality of proxy caching servers which cache playlists and media segments which can be retrieved from the servers and provided to the client devices. The caching that is used by these proxy caching servers can be conventional caching techniques used for streaming media content. As shown in FIG. 1, origin systems 103 and 105 can provide content and be the source of content to the content distribution networks 107, 109, and 111. The client devices, such as client devices 115 and 117, in turn can request playlists and media segments from the content distribution networks 107, 109, and 111. When a client device, such as client device 115 attempts to retrieve streaming media for a live event, it will initially request a playlist for the live event that does not include attributes specifying the most recent partial media segments or media segments at the end of the most recent playlist which is available from the origin server or origin system. When a content distribution network receives such unattributed playlist request, the CDN returns a cached playlist which is normally not the most current playlist available from the origin server. The client device can then attempt to retrieve the most current playlist available from the origin server by using aspects described herein.

Figure 2:
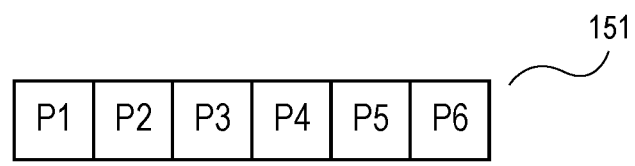
FIG. 2 shows an example of two media segments each of which are partitioned into six parts, with the part numbers shown within each media segment which is identified by a media segment number (MSN).
Figure 2:
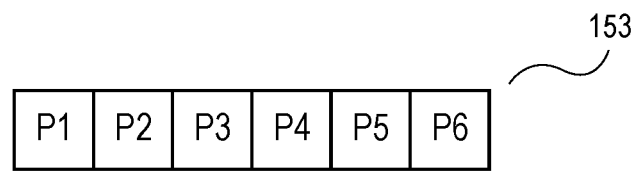

FIG. 2 shows an example of streaming media which is been broken into portions as is known in the art. Each of the portions, referred to as media segments, can be identified by a media sequence number (MSN), and within each media sequence number, there can be multiple parts. In the example shown in FIG. 2, two media segments 151 and 153 are shown as having been segmented into six parts each. Media segment 151 is followed by media segment 153 as indicated by the media sequence numbers shown in FIG. 2. Breaking a media segment into parts can improve tune in operations by client devices by allowing the client device to request partial media segments indicated by the part numbers such as part number P1, or P2 shown in FIG. 2.

Figure 3:
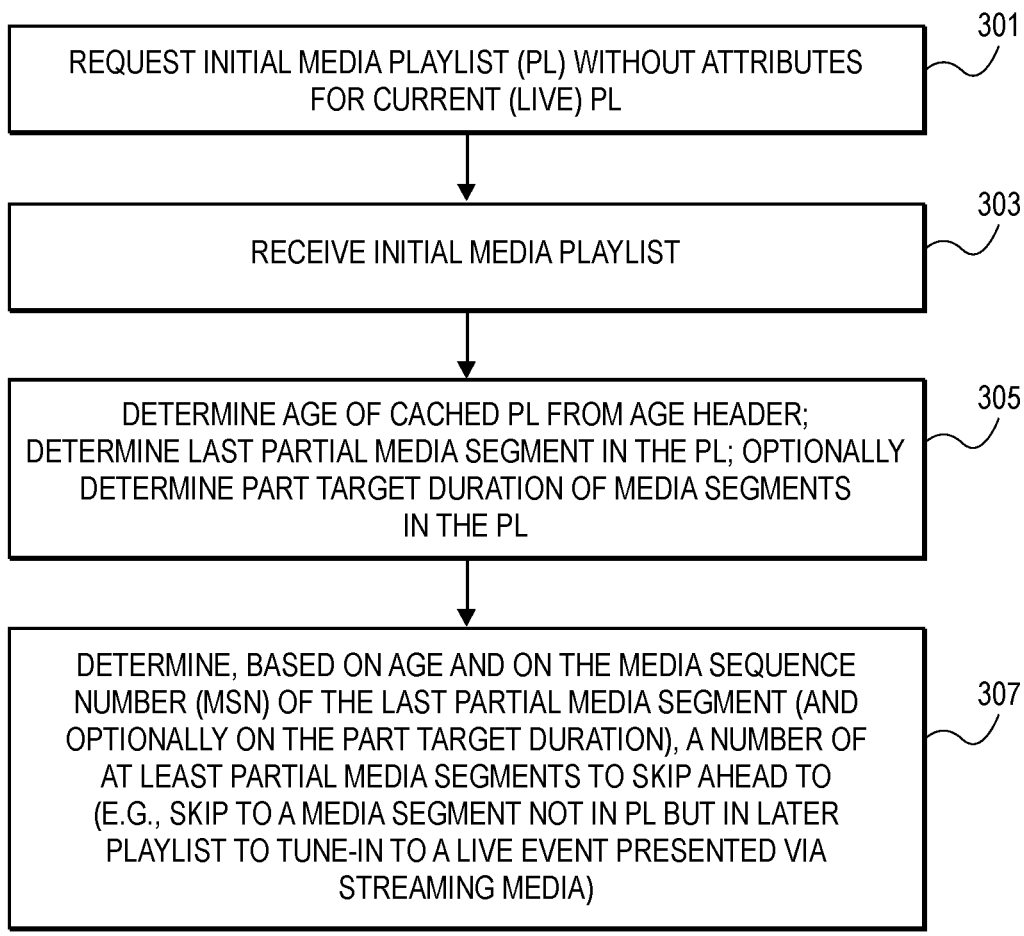
FIG. 3 is a flowchart which illustrates one aspect of this disclosure which can be used by a client device to tune into a streaming media content.

FIG. 3 shows a method according to one aspect that can improve the time it takes for a client device to tune into streaming media content such as a live event. The method can begin in operation 301. In operation 301, the client device can request an initial media playlist without attributes for the most currently available cached playlist. For example, the client device can make a generic media playlist request for the streaming content without including attributes that indicate a media sequence number and a part number for the most current playlist available from a caching server. Then in operation 303 the client device can receive the initial media playlist. According to one aspect, a header associated with the received media playlist can include age data which represents the age of the cached playlist which was received; according to one aspect, the age data can represent how long, in seconds, the playlist has been cached (at, for example, a caching proxy server in a CDN). In one aspect, the age data can have integer values only representing the time in seconds the playlist has been in the proxy cache. In operation 305, the client device can determine the age from the header and can also determine the last partial media segment in the received playlist. Optionally, the client device can also determine a part target duration value of media segments in the playlist. For example, if the target duration value (which indicates a maximum media segment duration) is five seconds, as specified by a parameter in the playlist, the playlist can also specify part target duration values which are less than five seconds each and represent a portion of a media segment. After operation 305, the client device can attempt to predict or determine a number of at least partial media segments to skip ahead in order to tune in more quickly to a current time in the streaming media content. This is shown as operation 307 in FIG. 3. According to one aspect, a client device can determine, based on the age data and on the media sequence number of the last partial media segment, a number of at least partial media segments to skip ahead in order to tune in to the streaming media content. The part target duration value can optionally be used in operation 307 when the number of at least partial media segments to skip is determined. For example, if the age is three seconds, then based upon the part target duration data the client device can skip ahead by the number of partial media segments which approximates three seconds beyond the last partial media segment in the initial media playlist was which was received in operation 303. Operation 307 may be repeated multiple times by requesting additional playlists and determining the age of each playlist. Thus, operations 303, 305 and 307 can be repeated by a client device in order to attempt to obtain the most current playlist which is available from the origin server.

Figure 4A:
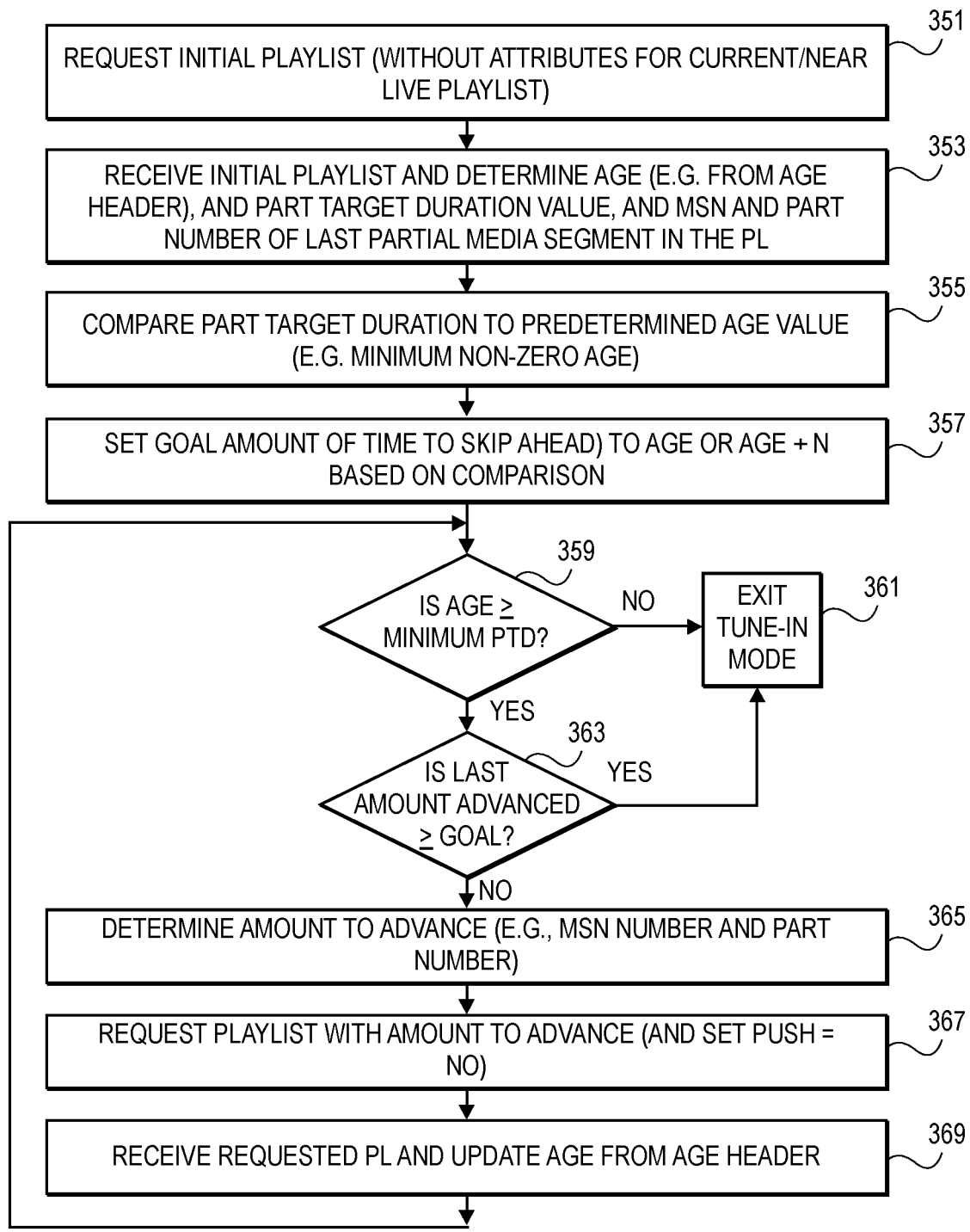
FIG. 4A is a flowchart which shows another aspect of this disclosure which can be used by a client device to tune into a streaming media content.

Another aspect which can be used by client devices shown in FIG. 4A. In this aspect, several parameters can be used by a client device to calculate or determine an amount to advance to skip at least one or more partial media segments after the last partial media segment at the end of the initial playlist. For example, if the last partial media segment at the end of the initial playlist has a media sequence number of 56 and a part number of 2, and the method shown in FIG. 4A determines that the amount to advance is one full media segment (with 6 parts) and 2 more additional parts (giving a total of 8 parts to advance forward or skip), then the client device will request a playlist with an attribute indicating msn=57, part=5. The client device in this instance would normally also indicate that it does not want to have any segments pushed to it by setting the push parameter to zero (push=0). Further information about the push parameter can be found in the provisional application referred to in the first paragraph of this disclosure. Normally, the push parameter is set to zero when the client device is in tune-in mode, and after exiting tune-in mode, the client device sets the push parameter to 1 or 2 (e.g., push=1) in order to reduce latency of the stream of content for receipt of media content for live events.

The method shown in FIG. 4A begins in operation 351. In operation 351, the client device can request an initial playlist; the playlist request is without attributes which specify a near live playlist. Then in operation 353, the client device receives the initial playlist and receives other data, such as age data in a header. The playlist can include a part target duration value and also can include media sequence numbers and part numbers for the various media segments in the playlist. The last partial media segment in the playlist includes a media sequence number and a part number for that last partial media segment. The client device can then use the data received to calculate an amount to advance. These calculations can begin with operation 355 in which the client device compares the part target duration to a predetermined age value. In one aspect, the predetermined age value can be a minimum non-zero age. In one implementation, the predetermined age value can be the value of one second. After the comparison in operation 355, the client device can set a goal value in operation 357. The goal value can be the amount of time (in seconds) to skip ahead from the last partial media segment in the playlist which was received in operation 353. In one implementation, the goal is set based upon the comparison in operation 355. In one implementation, the goal is set to the value of the age data if the part target duration value is greater than or equal to the predetermined age value, and the goal is set to the value of the age data plus a constant value (N) if the part target duration value is less than the predetermined age value. Then in operation 359, the age data is compared to a part target duration specified in the last received playlist. If the age data is greater than or equal to the part target duration then processing proceeds to operation 363 as shown in FIG. 4A; on the other hand, if the age data is not greater than or equal to the part target duration as determined in operation 359, then processing proceeds to operation 361.

In operation 361, the client device exits the tune in mode. The exit from the tune in mode normally means that the client device will stop skipping over media segments and will begin to process the media segments by requesting media segments in the order in the playlist. In one aspect, the client devices can use nonzero push values to cause pushing of future media segments as described in the provisional patent application referred to in the first paragraph of this disclosure. Once the client device has exited the tune in mode, the client device begins to process media segments in the normal fashion by requesting media segments and receiving them and presenting them as opposed to skipping over and not requesting media segments which occurs in some aspects of the tune in mode described herein. In operation 363, the client device compares the last amount advanced (from the prior advance) to the goal value as shown in operation 363. When the initial playlist is being processed, the last amount advanced is zero and thus processing will proceed to operation 365. However, if the last amount advanced is nonzero, it may exceed or equal the goal in which case processing will revert back to operation 361 which is been described above.

In operation 365, the client device determines an amount to advance by calculating, according to one aspect, the number of parts to advance to skip over media segments after the last partial media segment in the current playlist. In one implementation, the amount to advance is calculated based on the goal value which may be the age data value or the age plus constant (N) value. The goal value can be divided by a value for the part target duration, and the result of this division produces a number which can be rounded down to the nearest integer to provide a number representing the number of parts to skip over after the last partial media segment in the current playlist. For example, if the last partial media segment at the end of the initial playlist has a media sequence number of 56 and a part number of 2, and the method shown in FIG. 4A determines that the amount to advance is one full media segment (with 6 parts) and 2 more additional parts (giving a total of 8 parts to advance forward or skip), then the client device will request a playlist with an attribute indicating msn=57, part=5. After determining the amount to advance, the client device in operation 367 and requests the next updated playlist with the amount to advance specified as an attribute in the playlist request. Then in operation 369, the client device receives the requested playlist and determines an updated age value from the age header. Following operation 369, the client device reverts back to operation 359 to repeat the process shown in FIG. 4A until the client device exits the tune in mode. In one implementation, following operation 369 the client device can check the playlist received in operation 369 to determine how much more media duration it has compared to the initial playlist. The playlist received in operation 369 may not have advanced by an expected amount if the partial segments were smaller than the part target duration. If this occurs, the goal can be increased based on a difference between the expected amount of advance and the actual advance. In one aspect, the client device may remain in the tune in mode until the process indicates that it should exit the tune in mode; in another aspect, the client device may also use a timer (e.g., a watch dog timer) which will force the device to exit the tune in mode even if the process shown in FIG. 4A does not cause the device to exit the tune in mode. In yet another aspect, a client device can exit the tune-in mode (even if the process shown in FIG. 4A does not cause the device to exit the tune-in mode) after a predetermined number (e.g., a maximum number) of tune-in attempts; for example, after 6 tune-in attempts, the client device can exit the tune-in mode.

Figure 4B:
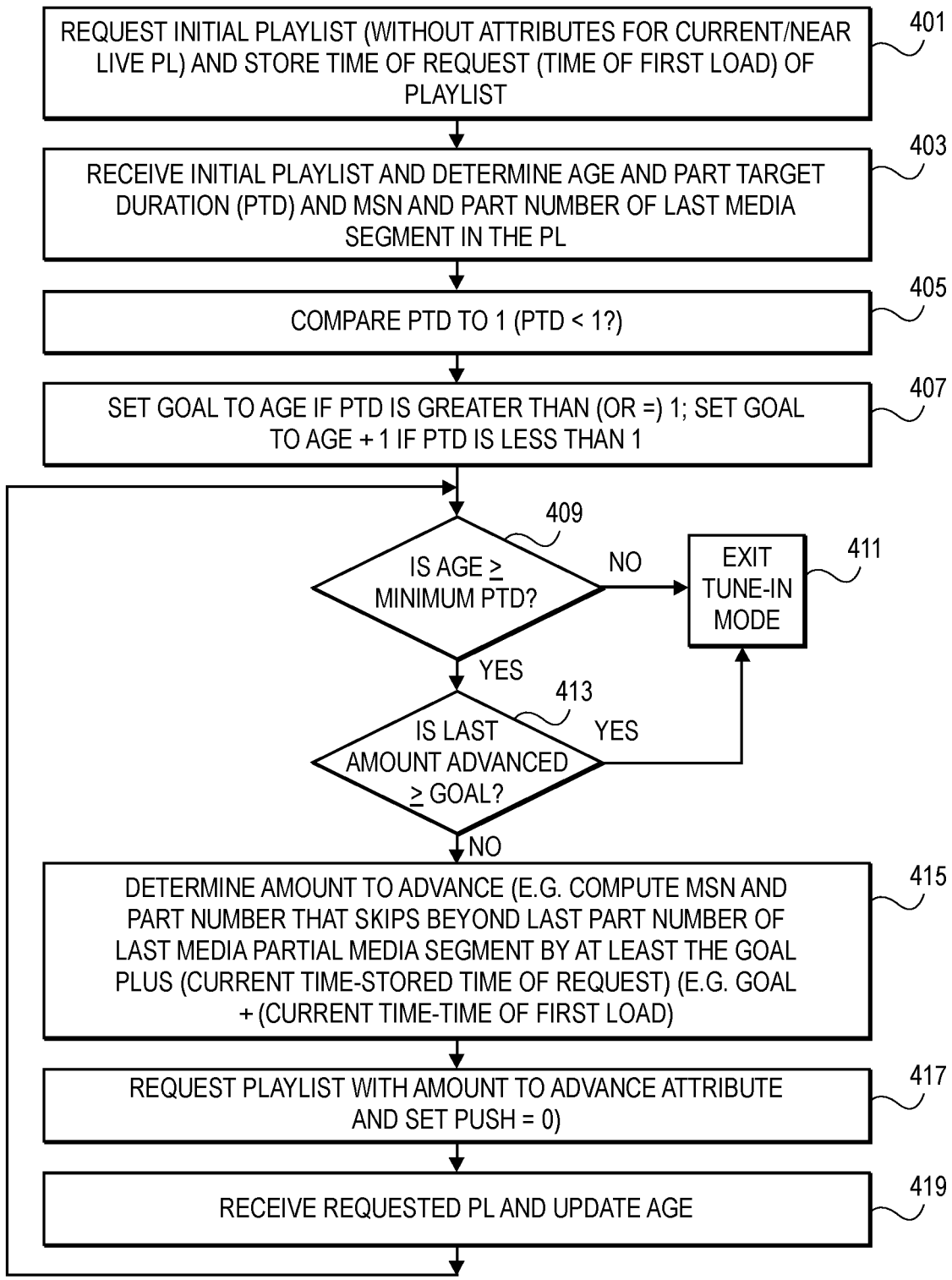
FIG. 4B is a flowchart which illustrates another aspect of this disclosure which can be used by a client device to tune into streaming media content.

The method shown in FIG. 4B is similar to the method shown in FIG. 4A except that the method shown in FIG. 4B uses additional parameter values to calculate the amount to advance in order to skip beyond the last partial media segment in the playlist that was last received. In operation 401, the client device can request an initial playlist, which request is without attributes that specify a near live playlist; the client device stores the time of this request, which time is later used in the calculations to determine an amount to advance. This stored time may be referred to as TimeOfFirstLoad. Then in operation 403, the client device receives the requested playlist and determines the age data (from a header) and the part target duration value from the playlist and also determines the media sequence number and part number of the last partial media segment in the playlist. Then in operation 405, the client device compares the part target duration to the value of one; in one implementation this comparison can be "PTD<1?" The result of this comparison can be used to set the goal value in operation 407. In operation 407, the goal value can be set to the age data value if the part target duration is greater than or equal to one, and the goal value can be set to the age data value +1 if the part target duration is less than one. Then the client device can perform the comparison operation in operation 409. If the age data value is greater than or equal to the part target duration then the client device proceeds to operation 413; on the other hand if the age data is less than the PTD, then the client device proceeds to operation 411 in which it exits the tune in mode as described above. In operation 413, the client device compares the last amount advanced to the goal value. If the last amount advanced exceeds or equals the goal value then processing proceeds to operation 411 in which the client device exits the tune in mode. On the other hand, if the goal value is greater than the last amount advanced in processing proceeds to operation 415.

In operation 415, the client device determines the amount to advance; for example the client device can compute the media sequence number and part number that skips beyond the last part number of the last partial media segment (in the last received playlist) by at least the goal plus however long it has been since the last received playlist was first loaded. In one aspect, this can be calculated based upon the current time and the stored time which was stored in operation 401 (TimeOfFirstLoad); for example the amount to advance can be equal to: goal+(current time−TimeOfFirstLoad). Then in operation 417, the client device can request the next updated playlist with the amount to advance attribute in the playlist request. In operation 419, the client device can then receive the requested playlist and update the age value based upon the age data in the header associated with the received playlist. Then processing can revert back to operation 409 in the loop which can continue until the client device exits the tune in mode. The exits from the tune in mode can occur as a result of the processing logic shown in FIG. 4B or as a result of a watchdog timer which forces an exit from the tune in mode based upon the expiration of the watchdog timer. In one aspect, the use of the stored time (TimeOfFirstLoad) can be optional in the method of FIG. 4B and be used when the difference between the stored time and the current time exceeds a threshold value (and when the difference does not exceed the threshold value, the stored time is not used).

Figure 5A:
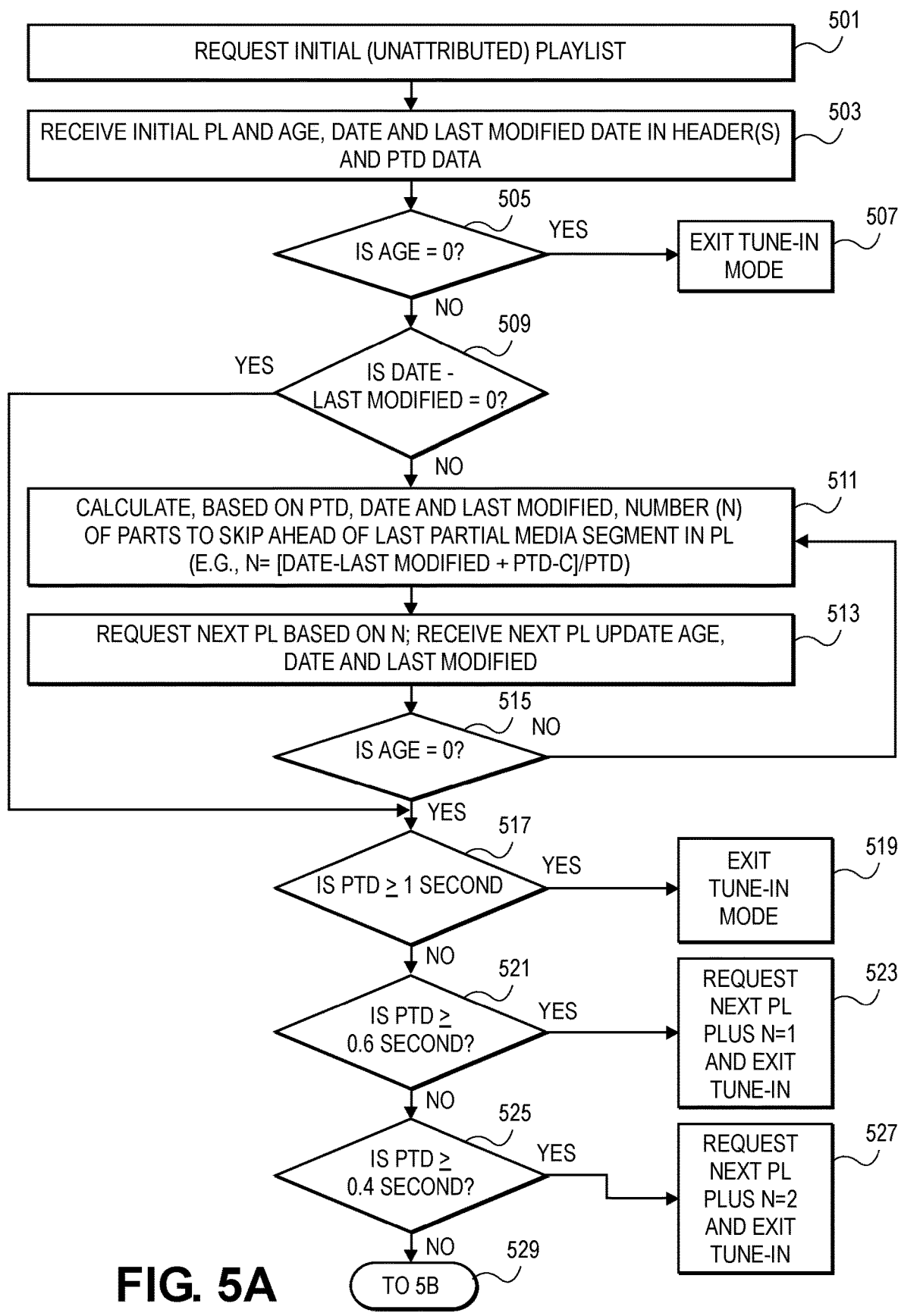
FIGS. 5A and 5B show a flowchart that represents a method which can be performed by a client device according to another aspect of this disclosure.

FIG. 5A shows another example according to an aspect which utilizes additional data in headers obtained from an origin server. In this aspect, certain rules with respect to the origin servers may be used to require the origin servers to provide last modified date data in one or more headers that accompany a playlist. This data can be used by client devices to calculate an amount to advance in order to expedite the tune in mode. In one implementation, the origin servers can be required to provide the last modified date data in one or more headers for each playlist which is requested; in another implementation, the origin servers can be required to provide the last modified data upon request from a client device while the client device remains in a tune in mode. The client device can also use date data which can be a timestamp which indicates the time when a caching server responded to the request for the playlist. The last modified date data can be a timestamp which indicates the time of last modification of the playlist at the origin server. The method shown in FIG. 5A begins in operation 501 in which the client device requests an initial unattributed playlist. Then in operation 503, the client device receives the initial playlist and also receives age data and last modified data in one or more headers. The client device can also determine the date data from a header in the response containing the playlist. The client device can also determine the part target duration value from the playlist in operation 503. Next, in operation 505, the client device determines whether the age data is equal to zero. If it is, the client device exits the tune in mode in operation 507. On the other hand, if the age data is not equal to zero, then operation 509 follows in which the client device determines whether the date value minus the last modified time value is equal to zero. Since both values are integer values, if the subtraction shown in operation 509 produces a value of zero, then the client device is within one second of the most current playlist at the origin server, in which case processing proceeds to operation 517 which will be described further below. On the other hand, if operation 509 determines that date minus last modified is not equal to zero, processing proceeds to operation 511 which calculates an amount to advance. In operation 511, the calculation can be based upon the part target duration, the date data and the last modified date. The calculation can determine a number of parts to skip ahead of the last partial media segment in the playlist that was last received in operation 503. In one implementation, this calculation can be: N=[date−last modified+PTD−c]/PTD, where c is a small value (e.g., 0.01) designed to ensure N is rounded down. The calculation of N from operation 511 is then used in operation 513 in the request for the next playlist. The next playlist is received and the age data is updated along with the last modified date value received from the origin server.

Then the client device performs the comparison operation of 515; in particular, the client device determines whether the age data is equal to zero. If it is not, processing reverts back to operation 511 as shown in FIG. 5A. If the age data is equal to zero then processing proceeds to operation 517. In one aspect, because the age data values are integer values only, if operation 515 determines that age is equal to zero, then it is likely that the client device is within one second of the live event or within one second of the most current playlist on the origin server.

Figure 5B:
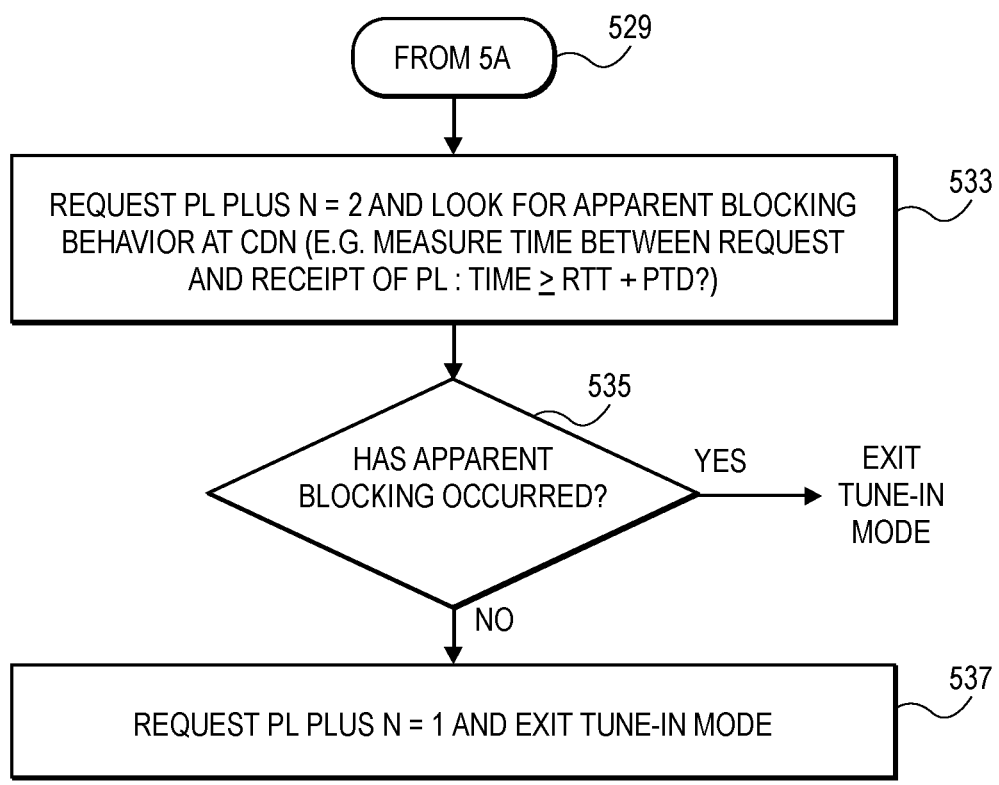

The remaining operations shown in FIGS. 5A and 5B seek to get the client device even closer to the current live edge of the current playlist. In operation 517, the client device determines whether the part target duration is greater than or equal to one second. If it is, the client device exits the tune in mode in operation 519 because each part target duration is greater than one second and hence it is not likely that the client device can improve on latency at this point. If operation 517 determines that the part target duration is less than one second, then in operation 521 the client device determines whether the part target duration is greater than or equal to 600 ms. If it is, then processing proceeds to operation 523 in which the client device requests the next playlist with an N value of +1 to skip over one and then exits the tune in mode under the assumption that the next playlist will be current enough for the client device. If the client device in operation 521 determines the part target duration is less than 600 ms then processing proceeds to operation 525 in which the client device determines whether the part target duration is greater than or equal to 400 ms. If it is, then processing proceeds to operation 527 in which the client device request the next playlist with an advance or amount to advance value equal to two parts and then exits the tune in mode. If in operation 525 the client device determines that the part target duration is less than 400 ms then processing proceeds to operation 533 shown in FIG. 5B. In operation 533, the client device requests the next playlist plus an amount to advance of N=two parts and looks for an apparent blocking behavior at the content distribution network. This apparent blocking behavior is described in the prior provisional patent application referred to in the first paragraph of this disclosure. This behavior arises from the fact that if a playlist is returned quickly after a request, then it was probably cached whereas if the playlist takes more time to be returned, it is probably as a result of blocking behavior at the content distribution network, which blocking behavior is described in the prior provisional patent application. In one aspect, this may be implemented by measuring the time between the request and receipt of a playlist. For example, if the measured time exceeds the round-trip time (RTT) plus the part target duration then it can be presumed that apparent blocking behavior has occurred, which means that the client device can exit the tune in mode. In particular, referring back to FIG. 5B, the decision block 535 can detect that apparent blocking has occurred by the measured time exceeding the round-trip time plus the part target duration and can then cause the client device to exit the tune in mode. On the other hand, if operation 535 indicates that apparent blocking did not occur then the client device can request the next playlist plus an amount of advance with N=one and can then exit the tune in mode.

It will be appreciated that variations of the methods described herein may use less parameters or fewer decision blocks; for example one or more of the decision blocks 517, 521, and 525 may be eliminated in these variations.

Figure 6:
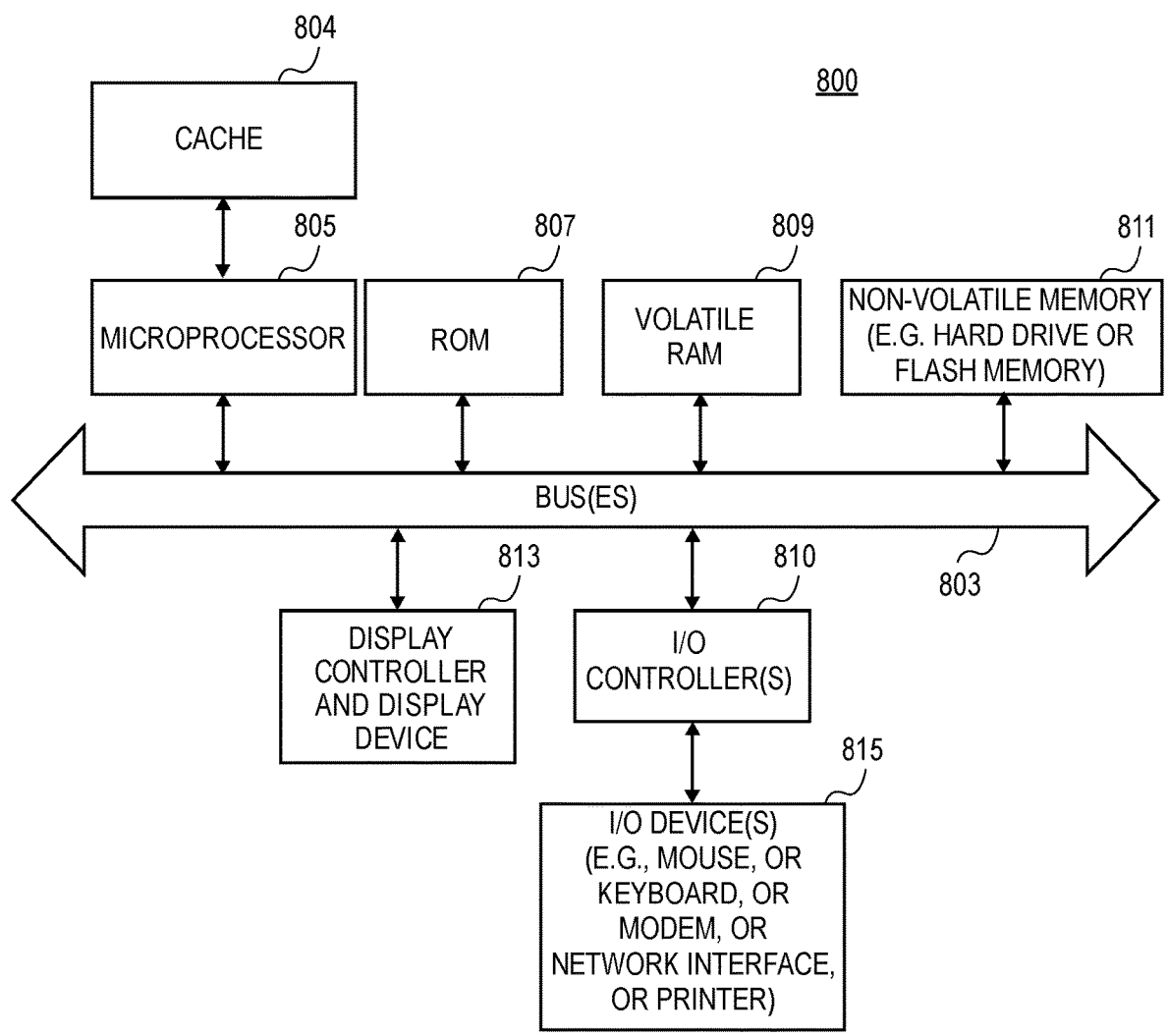
FIG. 6 shows an example of a data processing system that can be used to implement on or more aspects described in this disclosure.

FIG. 6 shows one example of a data processing system 800, which may be used with one embodiment. For example, the system 800 may be implemented to provide a client device or other systems shown in FIG. 1. Note that while FIG. 6 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 6, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 8 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed by a data processing system cause the data processing system to perform a method comprising:
    requesting, by a first request, a first playlist for a media content, the first request not containing at least one attribute for a near live playlist for the media content;
    receiving the first playlist in a transfer protocol compliant manner, the first playlist comprising a plurality of uniform resource identifiers (URIs), the plurality of URIs indicating an order of playback of multiple media segments that can be received, in the transfer protocol compliant manner, to recreate the media content, the first playlist comprising a last URI in the order that identifies a last available media segment in the first playlist;
    receiving first age data associated with the first playlist, the first age data indicating an age of the first playlist on a caching server;
    determining, based on the first age data and based on the last URI, a first number of at least partial media segments after the last available media segment in the first playlist, the first number specifying a number of at least partial media segments to skip over, after the last available media segment, to tune-in to the media content.

2. The medium as in claim 1 wherein the last URI includes a media sequence number and a part number and the first playlist specifies a target duration and a part target duration and wherein the first number of the least partial media segments is determined based on (1) the first age data and (2) the media sequence number and the part number in the last URI and (3) the part target duration.

3. The medium as in claim 2 wherein the part target duration is compared to a predetermined minimum age value and a result of the comparison provides a base value from which the first number is determined.

4. The medium as in claim 3 wherein the predetermined age value is 1 and wherein the base value is the first age data if the part target duration is greater than 1 second in duration and wherein the base value is the first age data plus a first additional value if the part target duration is less than 1 second.

5. The medium as in claim 4 wherein the first additional value is 1 or a fraction less than 1.

6. The medium as in claim 4 wherein the method further comprises:
    determining a first time period between a current time and one of (1) a time when the first request was requested or (2) a time of receipt of the first playlist.

7. The medium as in claim 6 wherein the method further comprises:
    adding a second additional value to the base value, the second additional value based on the first time period.

8. The medium as in claim 7 wherein the first number is the sum of the base value, the first additional value if the part target duration is less than one second, and the second additional value.

9. The medium as in claim 7 wherein the method further comprises:
    requesting a second playlist with a URI based on the first number;
    receiving the second playlist and a second age data; and
    updating the base value based on the second age data.

10. The medium as in claim 9 wherein the method further comprises:
    comparing the second age data to the part target duration to determine whether to exit a tune-in mode.

11. The medium as in claim 10 wherein the method further comprises:
    exiting the tune-in mode if the second age data is less than a minimum part target duration.

12. The medium as in claim 11 wherein the method further comprises:
    determining whether the first number is greater than the second age data and exiting the tune-in mode if the first number is greater than the second age data.

13. The medium as in claim 1 wherein the method further comprises:
    exiting a tune-in mode in response to detecting that the first age data was not received.

14. A non-transitory machine readable medium storing executable program instructions which when executed by a data processing system cause the data processing system to perform a method comprising:
    requesting, by an unattributed request during a tune-in mode, a first playlist for a streaming media content, the unattributed request lacking attributes for a near live playlist of the streaming media content;
    receiving the first playlist in a transfer protocol compliant manner, the first playlist comprising a plurality of uniform resource identifiers (URIs), the plurality of URIs indicating an order of playback of multiple media segments that can be received, in the transfer protocol compliant manner, to recreate the streaming media content, the first playlist comprising a last URI in the order that identifies a last available media segment in the first playlist;
    determining whether a first age data is received with the first playlist;
    exiting the tune-in mode in response to determining that the first age data was not received or has a minimum value if the first age data was received.

15. The medium as in claim 14 wherein the minimum value is zero.

16. The medium as in claim 14 wherein the method further comprises:

determining, based on a difference value, a first number of at least partial media segments after the last available media segment in the first playlist, the first number specifying a number of at least partial media segments to skip over, after the last available media segment, to tune-in to the streaming media content.

17. The medium as in claim 16 wherein the difference value comprises a difference between a first date header and a last modified date header, and wherein the first date header comprises a timestamp for a time when a caching server responded to the request for the first playlist and the last modified date header comprises a timestamp for a time of last modification of the first playlist.

18. The medium as in claim 17 wherein the method further comprises:

requesting a second playlist with a URI based on the first number;

receiving the second playlist.

\* \* \* \* \*